3,098,707
URANIUM ORE-CARBONATE LEACH PROCESS INVOLVING ADDITION OF CHLORINE, ALKALI METAL HYPOCHLORITE OR AMMONIUM HYPOCHLORITE TO PREGNANT LIQUOR DERIVED THEREFROM
Clifford J. Lewis, Golden, Colo., assignor to Phillips Petroleum Company, a corporation of Delaware
Filed Aug. 25, 1958, Ser. No. 756,961
6 Claims. (Cl. 23—14.5)

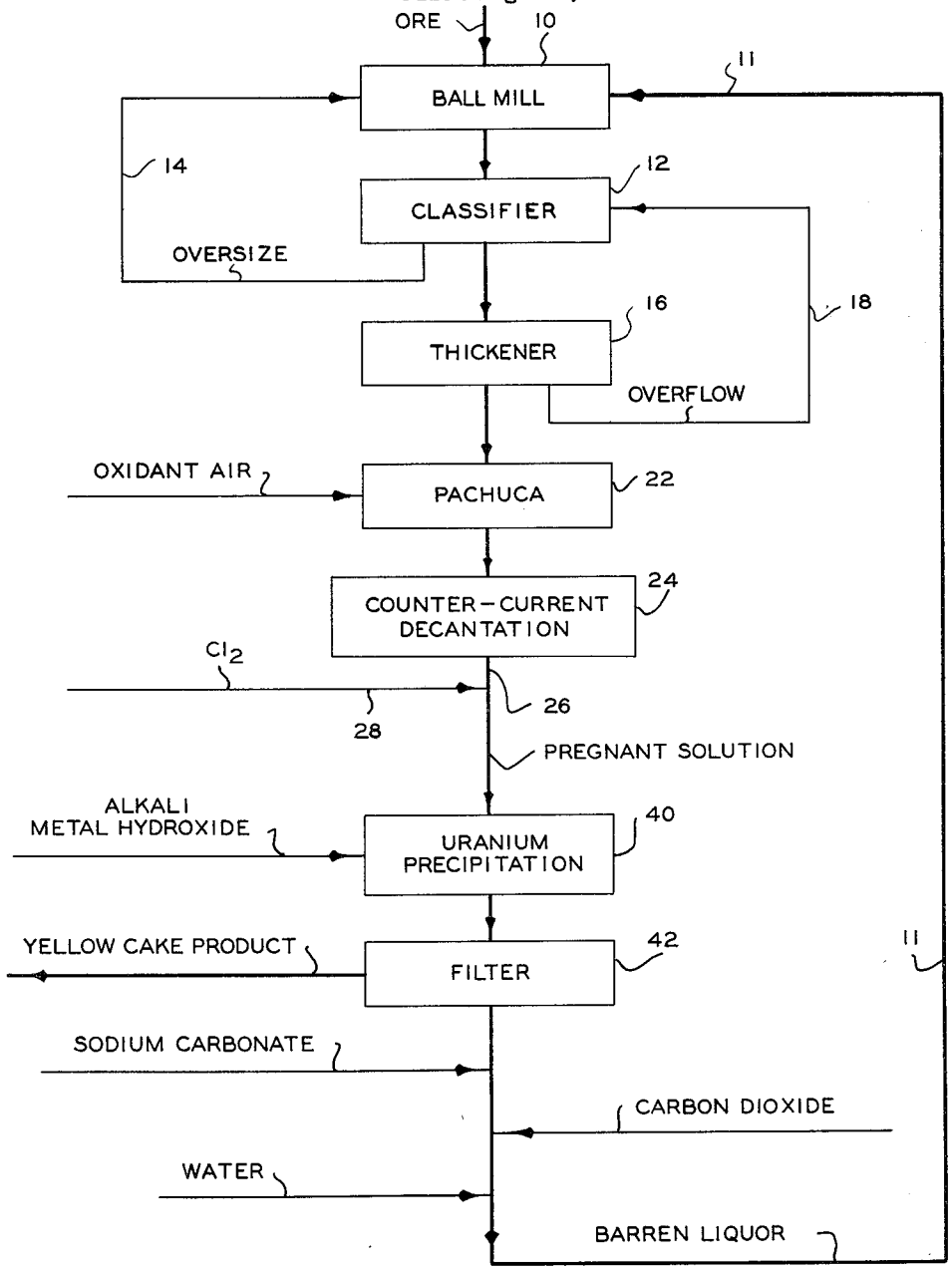

This invention relates to a process for increasing the recovery of uranium values from ore. In one specific aspect it relates to increasing the recovery of uranium from its ore by contacting liquid formed in the carbonate leach process with chlorine or sodium hypochlorite.

One of the processes for concentrating uranium values from its ore involves contacting the ore with a basic carbonate solution to form a so-called pregnant liquor and precipitating the uranium values from the pregnant liquor by addition of a hydroxide. It is proposed to increase the recovery of uranium in this and related processes by contacting a uranium containing liquor such as the pregnant liquor with sodium hypochlorite. A study of uranium ores has demonstrated that such ores contain a small amount of organic material in the form of fossil plant debris (coaly materials) and of petroliferous substance (pyrobitumen). These organic materials have a definite association with the uranium values, e.g., coffinite. When the ore is subjected to the leaching process it is thought that the coaly materials and pyrobitumen form a complex with particles of uranium-containing values. This hinders recovery of such particles in subsequent processing. I have found that the effect of organic materials can be reduced by contacting the pregnant liquor with chlorine or certain hypochlorites. Subsequent precipitation of uranium values, such as sodium diuranate, from the liquor shows an increased yield over processes where adding the chlorine is not done.

It is an object of this invention to improve uranium recovery by adding chlorine or other suitable materials to solutions containing uranium values.

The drawing represents a flow sheet of the essential portions of the carbonate leach process that employs the step of adding chlorine.

Referring now to FIGURE 1, ore comprising uranium-containing minerals such as uraninite, pitchblende, brannerite, carnotite, coffinite, gummite, autunite, tyuyamunite, uranophane and the like, after being crushed and screened is directed to a ball mill 10. In the ball mill the ore is wet ground in contact with an ammonium or soluble alkali metal carbonate solution. Sodium carbonate is generally preferred. Potassium carbonate is also suitable. The carbonate solution is introduced through line 11. A slurry leaves the ball mill and passes through a classifier 12 where over-sized particles are returned to the ball mill via conduit 14 and the remainder passes on to a thickener 16 where the underflow from the classifier is concentrated from a relatively dilute slime pulp into a thick pulp and where the rejected water is removed through line 18. From the thickener the thickened pulp or liquor goes to the autoclaves (pachuca tanks) 22 where it is contacted with oxygen by passing air therethrough and maintained at a predetermined temperature (see Example I below) for a time to generate a solution which is termed in the art the pregnant liquor.

The reactions carried out in the pachuca tanks 22 can be represented as follows:

$USiO_4 + \tfrac{1}{2}O_2 + 3Na_2CO_3 + H_2O$
$\quad \rightleftharpoons SiO_2 + Na_4UO_2(CO_3)_3 + 2NaOH$ $2NaOH + 2NaHCO_3 \rightarrow 2Na_2CO_3 + 2H_2O$ The liquor leaves the pachucas 22 and is clarified by passing through a filtration or decantation apparatus 24 (or series thereof) to remove solids from the solution. The solution then goes through line 26 to a point where chlorine gas is bubbled into, or where sodium hypochlorite solution is injected into the stream through a conduit 28. After mixing (if desired) and/or sufficient contact time, the pregnant solution is directed to a contacting apparatus 40 where it is reacted with a hydroxide, preferably of the carbonate value used in leaching, e.g., where sodium carbonate is used to leach, sodium hydroxide is used. In other words, the hydroxide and carbonate are both associated with the same metal cation. The reaction occurring with the hydroxide involves precipitation of the uranium values and can be represented by the equation given below.

$2Na_4UO_2(CO_3)_3 + 6NaOH \rightarrow Na_2U_2O_7 + 6Na_2CO_3 + 3H_2O$

The product stream from the tank 40 goes to a filter 42 from whence the precipitated uranium compound is removed and is then dried and packaged. The filtrate, termed the barren liquor, leaves the filter 42 and is recycled to the ball mill 10. Enroute to the ball mill the barren liquor has makeup water and sodium carbonate added and is also carbonated in a carbonating tower by contacting the solution with carbon dioxide. The carbon dioxide may be obtained from flue gases produced by oxidation of carbonaceous fuels.

EXAMPLE I

A uranium bearing ore was leached with sodium carbonate solution and filtered to provide a pregnant liquor having the following analysis:

| | Grams per liter |
|---|---|
| $U_3O_8$ | 0.870 |
| $V_2O_5$ | 0.030 |
| Mo | 0.030 |
| $SO_4^=$ | 2.35 |
| $Na_2CO_3$ | 18.0 |
| $NaHCO_3$ | 7.4 |

(1) Then, a 400 ml. aliquot of this solution at 130–140° F. was treated with 0.976 gram NaOH to neutralize the $NaHCO_3$ and with 4.04 grams excess NaOH to precipitate the uranium $U_3O_8$. The mixture was agitated for 6 hours, allowed to settle and filtered. The filtrate was analyzed for $U_3O_8$ and the amount of $U_3O_8$ that had precipitated was calculated from the analysis. It was determined that 90.1 percent of the $U_3O_8$ had precipitated.

(2) Test No. 1 conditions were repeated except that 4 ml. "Chlorox" was added to the test solution 5 minutes before caustic addition. In this test 92.2 percent of the $U_3O_8$ precipitated. From time to time, water was added to the 400 ccs. of the solution to compensate for that lost by evaporation. At the end of the precipitation period the system volume was 430 mls. Following removal of the yellow cake by filtration and washing of the yellow cake on the filter with water the filtrate volume was 465 mls. The sodium hypochlorite content of the "Chlorox" used was determined by actual analysis and found to be 5.25 percent by weight.

It took about 20 to 25 minutes for the yellow cake to appear in test No. 1 and about 15 to 20 minutes for it to appear in the test using "Chlorox." In the latter the yellow cake crystals appeared much smaller and silky, but filtered quite well. A considerable change in color was noted in the five minutes following the addition of the "Chlorox" as indicated by a lightening of the color of the pregnant solution.

EXAMPLE II

Table 1

| Analysis No. | Chemical Analysis, Grams/Liter | | | | | | | | |
|---|---|---|---|---|---|---|---|---|---|
| | Solution | $U_3O_8$ | $Na_2CO_3$ | $NaHCO_3$ | $SO_4^=$ | Total Sulfur | Total | | |
| | | | | | | | NaCl | Cl- | NaOH |
| 3 | Normal Pregnant | 2.09 | 46.45 | 12.99 | 3.74 | 1.83 | | | |
| 4 | Chlorinated Pregnant | 2.16 | 23.96 | 31.58 | 5.50 | 1.85 | 10.7 | 9.05 | |

(3) Two hundred fifty-five liters of normal pregnant liquor having analysis No. 3 above was heated to 160° F. then was treated with 1,577 grams caustic to neutralize and 1,182 grams caustic excess (or 2,759 grams caustic, having 4.5 grams per liter excess). The precipitate was recovered and it included 88 percent of the $U_3O_8$ dissolved in the pregnant liquor. The yellow cake (precipitate) contained 77.92 percent by weight of $U_3O_8$. The precipitation period was 6 hours.

(4) A 255 liter sample having analysis No. 3 was chlorinated by bubbling thereinto 8.1 grams of chlorine gas per liter of liquor treated at a rate of 148 grams per hour. The solution temperature during this addition was 60° F. This solution gave the analysis No. 4 above. The temperature was then raised to 160° F. and 4,932 grams caustic (4.5 grams liter excess) was added. Precipitate formed after about 15 minutes, and a precipitation period of 6 hours was allowed. Results included recovery of 95.1 percent of the $U_3O_8$ dissolved in the pregnant liquor, with the yellow cake having 77.92 percent by weight $U_3O_8$.

The addition of chlorine increased the proportion of inert salts (NaCl, $Na_2SO_4$, $Na_2S_4O_6$) as follows:

Table 2
$Na_2CO_3$ DISTRIBUTION
[Percentage of $Na_2CO_3$ equivalents]

| As | 3. In Normal Pregnant Solution | 4. In Chlorinated Pregnant Solution |
|---|---|---|
| $Na_2CO_3$ | 74.0 | 35.6 |
| $NaHCO_3$ | 13.9 | 33.5 |
| $Na_4UO_2(CO_3)_3$ | 4.4 | 4.4 |
| NaCl | 0.0 | 16.3 |
| $Na_2SO_4$ | 6.9 | 10.2 |
| $Na_2S_4O_6$ [1] | 0.8 | Nil |

[1] Assumed composition of the polythionates for calculation purposes.

The use of chlorine materially increased the bicarbonate in the pregnant liquor, thus increasing caustic requirements. The color of the pregnant liquor changed from light brown to pale yellow upon chlorination.

As exemplified by the preceding description and examples, it should now be apparent that an improvement in the recovery of uranium values in the carbonate leach process has been discovered. This is brought about by an oxidation reaction, and more specifically by chlorinating the pregnant liquor prior to precipitation. The value of the discovery is enhanced when it is realized that the major portion of the uranium values is recovered by procedures known to the prior art, but that the instant discovery enables recovery at an extreme end of the range, where improvements are increasingly harder to achieve.

It is considered practicable to add the oxidizing or chlorinating ingredient at the same time sodium hydroxide is added because the sodium hypochlorite is compatible and stable in the presence of sodium hydroxide. In the embodiment shown, the relation between using chlorine gas and the hypochlorite solution is as follows:

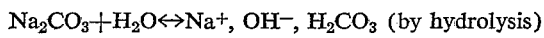

$$Na_2CO_3 + H_2O \leftrightarrow Na^+, OH^-, H_2CO_3 \text{ (by hydrolysis)}$$

$$2NaOH + Cl_2 \rightarrow NaOCl + NaCl + H_2O$$

Consideration has been given to other oxidizing agents, especially the hypochlorites of potassium and ammonium, which may be used. Such agents must form soluble salts before and after the precipitating reaction is carried out. This is a necessary characteristic because calcium hypochlorite, for example, does oxidize in the same manner as does sodium hypochlorite but it forms an insoluble calcium carbonate upon precipitation and this contaminates the yellow cake which is the end product. It is preferred to treat the clarified pregnant liquor, but the unclarified could be treated as well. This is primarily a matter of economics because a greater amount of reagent would be required to treat the unclarified, although certain advantages in the form of longer reaction time and more concentrated uranium solution would be available (the uranium solution, of course, being diluted by wash water added on the filters). It is also considered practicable to use these oxidizing agents to create an extreme oxidation of a bleed stream of barren liquor. Such bleed streams are drawn off to prevent sulfates from building up in the recycle stream.

It is not my intention to be limited to the specific example set forth or to the specific process disclosed in the appended drawing, specification, and claims but to include therein all that subject matter which would be obvious to one skilled in the art. Although sodium, potassium or ammonium carbonate are preferred for the leaching solution, it is to be understood that other carbonates could be used which would be soluble and which would produce the same results as to uranium value extraction. In the appended claims when I refer to a "basic carbonate solution" I thereby define a soluble carbonate of sodium, potassium, and ammonium and include those chemicals which would be the equivalents thereof in the instant process. Also, when I refer to a basic hydroxide, I mean the hydroxide of the same chemicals. Further, it is to be understood that when the leaching solution is such a carbonate of sodium, potassium or ammonium, respectively, then the hydroxide used to precipitate is preferably of sodium, potassium, or ammonium, but is not necessarily restricted thereto. The solution strengths are those necessary to carry out the respective leaching and precipitating reactions at suitable rates. Where carbonate solutions are referred to, it is to be understood there are also bicarbonates present in the solution.

What I claim is:

1. In the process of recovering uranium values from an ore by leaching the ore with a basic carbonate solution and then separating pregnant liquor containing soluble uranium values from the resulting leach slurry by filtering the latter, the improvement comprising adding to said separated pregnant liquor a material selected from the group consisting of chlorine and the hypochlorites of alkali metals and of ammonium.

2. In the process of extracting uranium values from an ore wherein the ore is leached with a soluble basic carbonate solution to form a slurry comprising insoluble solids and a pregnant liquor containing soluble uranium values, and said pregnant liquor is separated from said slurry, the improvement comprising adding to said separated pregnant liquor an oxidizing agent selected from the group consisting of chlorine, alkali metal hypochlorites, and ammonium hypochlorites.

3. An improved process of extracting uranium values from ore comprising comminuting the ore, leaching the ore by contacting it with a basic carbonate solution to thereby form a slurry comprising insoluble solids and a pregnant liquor containing soluble uranium values, separating said pregnant liquor from said slurry, clarifying said separated pregnant liquor, adding chlorine to said pregnant liquor after said clarifying step, and recovering said uranium values after said step of adding.

4. An improved process of extracting uranium values from ore comprising comminuting the ore, leaching the ore by contacting it with a basic carbonate solution to thereby form a slurry comprising insoluble solids and a pregnant liquor containing soluble uranium values, separating said pregnant liquor from said slurry, clarifying said separated pregnant liquor, adding sodium hypochlorite to said pregnant liquor after said clarifying step, and recovering said uranium values after said step of adding.

5. An improved process of extracting uranium values from ore comprising comminuting the ore, leaching the ore by contacting it with a basic carbonate solution to thereby form a slurry comprising insoluble solids and a pregnant liquor containing soluble uranium values, separating said pregnant liquor from said slurry, clarifying said separated pregnant liquor, then after said clarifying step adding to said pregnant liquor an oxidizing agent selected from the group consisting of chlorine, alkali metal hypochlorites, and ammonium hypochlorites, and then recovering said uranium values by increasing the pH of the pregnant liquor.

6. An improved process of extracting uranium values from ore comprising comminuting the ore, leaching the ore by contacting it with a basic carbonate solution to thereby form a slurry comprising insoluble solids and a pregnant liquor containing soluble uranium values, separating said pregnant liquor from said slurry, clarifying said separated pregnant liquor and then adding an oxidizing agent selected from the group consisting of chlorine, alkali metal hypochlorites, and ammonium hypochlorites, and recovering said uranium values from the liquor after said clarifying and adding step by increasing the pH of the pregnant liquor.

References Cited in the file of this patent

UNITED STATES PATENTS 808,839   Haynes et al. _____ Jan. 2, 1906

OTHER REFERENCES

Brown: ACCO-32, May 12, 1953 (date decl. Sept. 23, 1955) pp. 27 and 28.

Frank: ACCO-48, June 18, 1954 (date decl. Sept. 23, 1955) pp. 8-10, 15-20.

Clifford et al.: RMO-2621, June 1956, pp. 1, 2 and 22-26.

Beverly et al.: WIN-67, Feb. 15, 1957, pp. 6-12, 21-23.

Magno et al.: WIN-86, Aug. 23, 1957, pp. 4-7 and 13.